(12) United States Patent
Mutalik et al.

(10) Patent No.: US 8,917,986 B2
(45) Date of Patent: Dec. 23, 2014

(54) EXTENDED RANGE FOR CWDM OPTICAL TRANSPORT

(75) Inventors: Venk Mutalik, Middletown, CT (US); Marcel F. Schemmann, Maria Hoop (NL); Long Zou, Rocky Hill, CT (US); Zhijian Sun, Avon, CA (US)

(73) Assignee: ARRIS Solutions, Inc., Suwanee, GA (US)

( * ) Notice: Subject to any disclaimer, the term of this patent is extended or adjusted under 35 U.S.C. 154(b) by 1464 days.

(21) Appl. No.: 11/999,761

(22) Filed: Dec. 6, 2007

(65) Prior Publication Data

US 2008/0205882 A1 Aug. 28, 2008

Related U.S. Application Data

(60) Provisional application No. 60/873,381, filed on Dec. 7, 2006.

(51) Int. Cl.
*H01S 3/04* (2006.01)
*H01S 3/13* (2006.01)
*H04B 10/08* (2006.01)
*H04B 10/85* (2013.01)
*H04B 10/2537* (2013.01)

(52) U.S. Cl.
CPC ............ *H04B 10/85* (2013.01); *H04B 10/2537* (2013.01)
USPC ........... 398/7; 398/1; 398/45; 372/32; 372/34

(58) Field of Classification Search
USPC ................................. 398/95, 75, 93
See application file for complete search history.

(56) References Cited

U.S. PATENT DOCUMENTS

| 5,410,624 | A | 4/1995 | Morkel |
| 5,546,210 | A | 8/1996 | Chraplyvy et al. |
| 6,118,563 | A | 9/2000 | Boskovic et al. |
| 6,233,261 | B1* | 5/2001 | Mesh et al. ............... 372/29.012 |
| 6,366,376 | B1 | 4/2002 | Miyata et al. |
| 7,369,587 | B2* | 5/2008 | Stewart et al. ............. 372/29.02 |
| 7,565,083 | B1* | 7/2009 | Akasaka ........................ 398/159 |
| 7,725,033 | B2* | 5/2010 | Nakamoto ....................... 398/95 |
| 7,783,197 | B2 | 8/2010 | Litvin et al. |
| 2003/0137927 | A1* | 7/2003 | Sato ............................... 370/203 |
| 2003/0189750 | A1* | 10/2003 | Islam et al. ..................... 359/334 |
| 2005/0084270 | A1* | 4/2005 | Caplan et al. ................. 398/141 |
| 2005/0220397 | A1* | 10/2005 | Oikawa et al. .................. 385/24 |
| 2006/0198406 | A1* | 9/2006 | Seeds ............................... 372/32 |
| 2007/0077066 | A1* | 4/2007 | Nakamoto ....................... 398/33 |

OTHER PUBLICATIONS

Suzuki ["Super-Dense WDM Transmission Technology in the Zero-Dispersion Region Employing Distributed Raman Amplification" Journal of Lightwave Technology vol. 21 No. 4 Apr. 2003].*
Suzuki et al: "22×10 Gb/s WDM Transmission Based on Extended Method of Unequally Spaced Channel Allocation Around the Zero-Dispersion Wavelength Region", IEEE Photon Technol. Lett. vol. 11, No. 12, Dec. 1999, pp. 1677-1679.
Forghieri et al: "Repeaterless Transmission of Eight Channels at 10 Gb/s Over 137 km (11 Tb/s-km) of Dispersion Shifted Fiber Using Unequal Channel Spacing", IEEE Photon Technol. Lett, vol. 6, No. 11, Nov. 1994, pp. 1374-1376.

* cited by examiner

*Primary Examiner* — Oommen Jacob
(74) *Attorney, Agent, or Firm* — Lori Anne D. Swanson

(57) ABSTRACT

A optical transmission system includes light sources generating light of at least two wavelengths, where any two adjacent wavelengths are separated by less than 10 nm. The wavelengths fall within the zero dispersion zone of an optical fiber, and may be shifted by 1 nm or less to reduce crosstalk effects.

8 Claims, 2 Drawing Sheets

EXTENDED RANGE FOR CWDM OPTICAL TRANSPORT

PRIORITY CLAIM

The present application claims priority to:
U.S. provisional patent application EXTENDED RANGE FOR CWDM OPTICAL TRANSPORT, having application No. 60/873,381, filed on Thursday, Dec. 7, 2006.

TECHNICAL FIELD

The present disclosure relates to Coarse Wave Division Multiplexing.

BACKGROUND

A 20 nanometer (nm) wavelength spacing is used in conventional Coarse Wave Division Multiplexing (CWDM) optical communication networks. This wide spacing allows for the use of inexpensive optical components where the propagation distance is limited to under 30 km. However, when using 20 nm spacing effects such as Stimulated Brillouin Scattering (SBS) and/or Stimulated Raman Scattering can induce second and third order crosstalk effects that limit the distance that usable optical signals may propagate over optical fiber.

Longer distances may be achieved by increasing the power at which optical signals are generated at the source. However, SBS and/or SRS effects may increase with increases in optical power. This may limit the number of wavelengths that may be used over a particular distance at a certain optical transmission power. For example, with 20 nm wavelength spacing two (2) wavelengths may be used at 7 dBm optical power over distances of around 15-20 km. Three (3) wavelengths may be used at over distances of around 10-15 km when the optical power is reduced to 4 dBm.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

An optical transmission system may include and/or involve light sources generating light of at least two wavelengths, where any two adjacent wavelengths are separated by less than 10 nm, and where the wavelengths fall within the zero dispersion zone of an optical fiber, e.g. between 1303 and 1323 nm. A wavelength shifter may shift one or more of the wavelengths by 1 nm or less.

In some embodiments the wavelengths fall within the minimum loss window of an optical fiber, e.g. each being within 5 nm or less of 1550 nm.

The two wavelengths may be separated by between 3 and 8 nm. In some embodiments more than two wavelengths may be used. For example, light of eight wavelengths may be used, where the separation of any two wavelengths is less than 2 nm, and four of the wavelengths have a first polarization state and four of the wavelengths have a polarization state orthogonal to the first polarization state. The wavelengths may have an even or an uneven spacing from one another. Ideally, none of the wavelengths are substantially equal to the zero dispersion wavelength of the optical fiber, and the greatest separation between any two wavelengths is approximately 6 nm or less.

The system may include and/or involve one or more polarization filters to maintain an orthogonal polarization state between two or more of the wavelengths. The system may also include and/or involve a crosstalk detector capable of dynamically detecting when communication crosstalk exceeds an acceptable threshold. The crosstalk detector may cooperate with a wavelength shifter to shift one or more wavelengths of light that are substantially equal to the zero dispersion wavelength of the optical fiber.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

CWDM Transmission System

Figure 1:
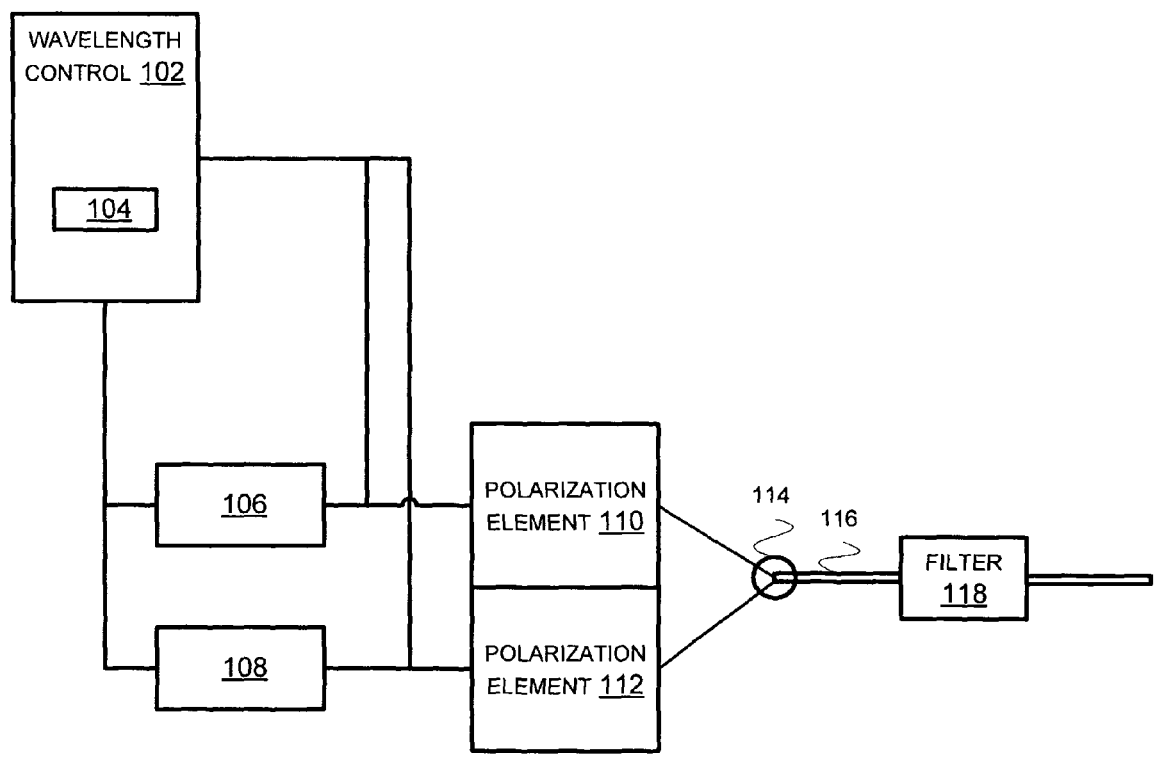
FIG. 1 is a block diagram of an embodiment of a CWDM transmission system.

FIG. 1 is a block diagram of an embodiment of a CWDM transmission system. The CWDM system includes, but may not be limited to, a wavelength controller 102 including laser wavelength monitor and control logic 104, a first laser light source 106, and a second laser light source 108. The system may also include polarization elements 110 and 112, an optical coupler 114, and an optical fiber 116. Some embodiments may include other elements and/or couplings among the elements that have been omitted from the illustration, as they would be apparent to skilled practitioners in the relevant art(s).

The wavelength control 102 is a device including laser wavelength monitor and control logic 104, to control the wavelengths of light emitted by first laser light source 106 and second laser light source 108. The wavelength control may include one or more hardware circuits and-or one or more dedicated signal processor and instructions in the form of software, firmware, and-or control circuitry, and-or one general purpose processor and instructions in the form of software, firmware, and-or control circuitry. The laser wavelength monitor and control logic 104 monitors the wavelength of the light emitted by first laser light source 106 and second laser light source 108 and controls the wavelengths of the emitted light, in order to both maintain spacing between the wavelengths and to shift one or both of the emitted wavelengths away from the ZDW (zero dispersion wavelength) of the fiber.

The first laser light source 106 emits light within a range of wavelengths, where the specific wavelength emitted is controlled by wavelength control 102. The laser 106 may comprise, for example, one or more of a cooled or uncooled red laser, and/or one or more semiconductor lasers. The second laser light source 108 emits light within a range of wavelengths, where the specific wavelength emitted is controlled by wavelength control 102. The second laser 108 may produce light over a similar range of wavelengths as first laser light source 106. The controller 102 may set the wavelengths of light emitted by the lasers 106, 108 such that the spacing between the wavelengths is between 3 and 10 nm. In one embodiment, the wavelength spacing is between 3 and 8 nm.

The polarization element 110 affects the polarization state of the light that passes through it, so that one polarization state predominates in the output light. One example of the polarization element 110 is one or more polarizing lenses. The polarization element 112 also affects the polarization state of the light that passes through it, so that the emergent light has a polarization state that is substantially perpendicular to the polarization state of the light emitted by polarization element 110.

The optical coupler 114 joins two optical waveguides onto a common optical waveguide. One example of an optical coupler 114 is a 2:1 fiber splice. The optical fiber 116 is a fiber material such as drawn glass with one or more cladding layers to effectuate efficient long-distance transport of optical signals, such as, for example, one or more an optical fiber having a zero dispersion wavelength in the range of 1310 nm, ±10 nm. The term 'zero dispersion wavelength', as used herein, refers to wavelength or wavelengths at which material dispersion and waveguide dispersion substantially cancel one another.

The system may include a filter 118 to maintain proper separation of the wavelengths. Characteristics of one filter embodiment are discussed in conjunction with FIG. 2.

Other examples and/or embodiments of light sources 106 and 108, polarization elements 110 and 112, optical coupler 114, optical fiber 116, and filter 118 may be apparent to skilled practitioners in the relevant art(s).

Crosstalk Reduction By Wavelength Selection, Spacing, and Adjustment

To reduce optical crosstalk and enable longer optical transmission distances, an optical transmission system may include light sources generating light of at least two wavelengths. Any two adjacent wavelengths are separated by less than 10 nm, and the wavelengths fall within the zero dispersion zone of an optical fiber. The system may include a wavelength shifter capable of shifting one or more of the wavelengths by 1 nm or less, in order to prevent one of the wavelengths from occupying the zero dispersion wavelength of the optical fiber. When one or more wavelengths occupy the zero dispersion wavelength, crosstalk effects may be observed to substantially increase. Thus, the wavelength shifter may be operable to ensure that none of the wavelengths are substantially equal to the zero dispersion wavelength of the optical fiber.

The shifter may be operated manually when crosstalk in the system exceeds acceptable levels. The shifter may also operate more autonomously. For example, the system may include a crosstalk detector capable of dynamically detecting when communication crosstalk exceeds an acceptable threshold. The crosstalk detector may cooperate with the wavelength shifter to shift one or more wavelengths of light that are substantially equal to the zero dispersion wavelength of the optical fiber. In some cases the shift may be relatively small, on the order of 1 nm or less.

Although FIG. 1 shows a system using two optical wavelengths, other embodiments could include three or more wavelengths, where adjacent wavelengths have even or uneven spacing from one another.

Adjustment of Polarization States

The system includes one or more polarization filters 110 and 112 to maintain an orthogonal polarization state between two or more of the wavelengths. Launching light in orthogonal polarization states may decrease SRS and other crosstalk effects.

CWDM Bandpass Filter

Figure 2:
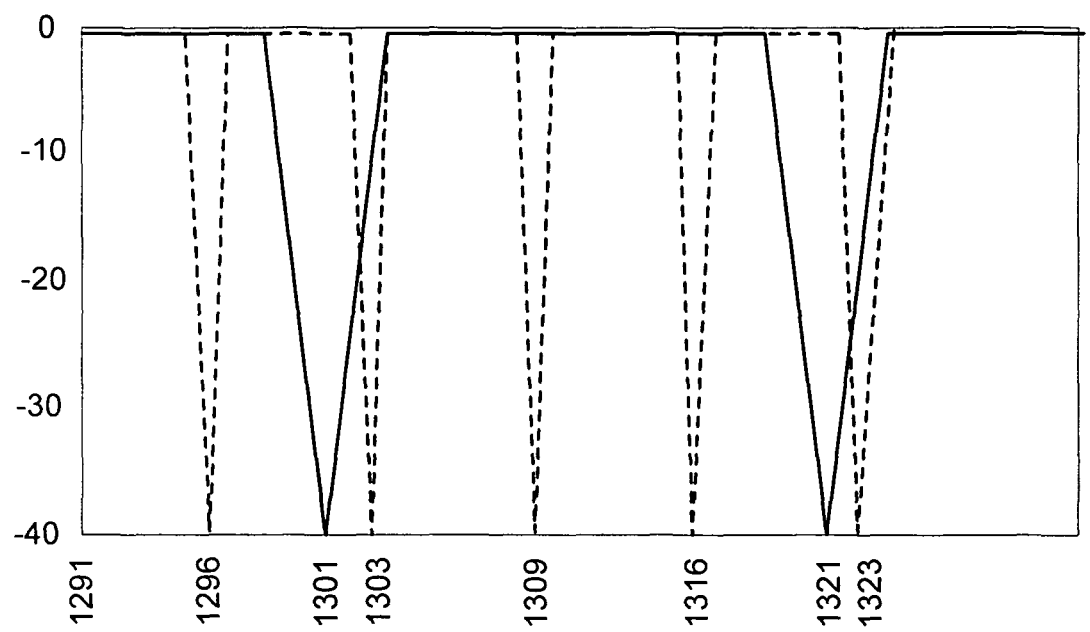
FIG. 2 is an illustration of an embodiment of CWDM bandpass filter characteristics.

FIG. 2 is an illustration of an embodiment of CWDM bandpass filter characteristics. The vertical axis represents decibels of insertion loss, and the horizontal axis represents wavelengths, in nanometers.

The solid line shows typical filter characteristics for a two-wavelength CWDM system, with a first passband centered around 1311 nm and another centered around 1331 nm or similarly outside the fiber's zero dispersion zone.

The dashed line shows characteristics of one embodiment of a filter in accordance with the techniques described herein. The filter has, among other things, passbands centered around the wavelengths 1306 nm and 1312 nm, both within the fiber's zero dispersion zone, with a total wavelength separation of 6 nm or less.

The filter may be operative in a system where the wavelengths of transmitted light fall between 1300 and 1325 nm, which comprises the zero dispersion zone of many optical fibers.

Two wavelengths of light may be used, separated by less than 10 nm. More specifically, light of two wavelengths may be used that is separated by between 3 and 8 nm. In some embodiments, two or more wavelengths may be used, and the greatest separation between any two wavelengths (e.g. the lowest and highest wavelengths that are used) is approximately 6 nm or less.

Using Larger Numbers of Wavelengths

In some embodiments, eight wavelengths of light may be used, where the separation of any two wavelengths is less than 2 nm, and four of the wavelengths have a first polarization state, and four of the wavelengths have a polarization state orthogonal to the first polarization state.

Of course, such systems are not limited in any fashion to using eight wavelengths specifically, and other numbers of wavelengths may also be used as the situation requires. The wavelengths may be evenly or unevenly separated.

Wavelengths in the Minimum Loss Window

It may also be possible to employ the wavelength selection and spacing techniques described herein within the minimum loss window of an optical fiber. For example, wavelengths may be selected each being within 5 nm or less of 1550 nm.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

We claim:

1. A optical transmission system comprising:
light sources each generating light within a range of wavelengths,
a controller for receiving the light generated by at least two of the light sources and setting a specific wavelength to each generated light such that any two adjacent wavelengths are separated by between 3 nm and 10 nm, wherein the wavelengths fall within the zero dispersion zone of an optical fiber;
a crosstalk detector for detecting communication crosstalk between wavelengths; and
a wavelength shifter capable of, in response to a detection of crosstalk by the crosstalk detector, wavelength shifter configured shift one or more of the wavelengths of light having the specific wavelength set by the controller by 1 nm or less to prevent the one or more wavelengths from occupying the zero dispersion wavelength of the optical fiber.

2. The optical transmission system of claim 1, wherein the light sources generating light of at least two wavelengths, where any two adjacent wavelengths are separated by less than 10 nm further comprises:
light of two wavelengths separated by between 3 and 8 nm.

3. The optical transmission system of claim 1, wherein the where the wavelengths fall within the zero dispersion zone of an optical fiber further comprises:
the wavelengths fall between 1300 and 1325 nm.

4. The optical transmission system of claim 1, wherein the light sources generating light of at least two wavelengths, where any two adjacent wavelengths are separated by less than 10 nm further comprises:
the greatest separation between any two wavelengths is approximately 6 nm or less.

5. The optical transmission system of claim 1, further comprising:
   one or more polarization filters to maintain an orthogonal polarization state between two or more of the wavelengths.

6. The optical transmission system of claim 1, further comprising:
   a crosstalk detector capable of dynamically detecting when communication crosstalk exceeds an acceptable threshold.

7. A optical transmission system comprising:
   light sources each generating light within a range of wavelengths wherein each generated light has a specific wavelength set such that any two adjacent wavelengths are separated by less than 10 nm;
   wherein the specific wavelengths fall within the minimum loss window of an optical fiber; and
   a wavelength shifter, in response to a detection of crosstalk, shifts one or more of the light having the specific wavelengths by 1 nm or less preventing the one or more wavelengths from occupying the zero dispersion wavelength of the optical fiber.

8. The optical transmission system of claim 7, wherein the where the wavelengths fall within the minimum loss window of an optical fiber further comprises:
   the wavelengths each being within 5 nm or less of 1550 nm.

\* \* \* \* \*